UNITED STATES PATENT OFFICE.

CHARLES E. BONINE, OF MELROSE PARK, PENNSYLVANIA, ASSIGNOR TO HENRY HESS, OF PHILADELPHIA, PENNSYLVANIA.

SOLDERING COMPOUND.

1,261,209.  Specification of Letters Patent.  Patented Apr. 2, 1918.

No Drawing.  Application filed October 15, 1915.  Serial No. 55,933.

*To all whom it may concern:*

Be it known that I, CHARLES E. BONINE, a citizen of the United States, residing at Melrose Park, in the county of Montgomery and State of Pennsylvania, have invented certain new and useful Improvements in Soldering Compounds, of which the following is a specification.

This invention relates to a soldering compound or mixture in the form of a pasty mass, containing the necessary soldering materials, such as solder metal and a flux, which mixture may be conveniently applied without waste to the parts to be joined, and which may be melted by the application of a moderate degree of heat.

Compounds of this character are now in use, in which the solder metal is in powdered form mixed with a liquid flux and a suitable vehicle, and put up in cans or collapsible tubes for use. It has been found in practice, however, that when the mixture stands for a time, the ingredients segregate, the flux rising to the top, and the metallic ingredients settling at the bottom. With the contents of the container in this condition, the first portion used will have a surplus of flux, while the last portion will be comparatively dry. The dry material does not operate well, owing to the insufficiency of flux, while the portion first used contains too much flux for satisfactory work. When the material is put up in collapsible tubes, the segregation of the ingredients described, results in the same objectionable conditions, and is further objectionable in that the dry condition of the material interferes with its proper flow from the tube under pressure.

It is the aim of my invention to overcome these objections, and to produce a soldering compound or mixture in pasty form, which will not show segregation after standing for long periods of time, and which will not change its consistency, whereby the ingredients will remain properly and uniformly distributed throughout all portions of the mass, and the mixture may be properly handled in collapsible tubes, as well as in cans and the like.

With these ends in view, I incorporate in a mixture of soldering materials, a suitable binder having the property of holding the ingredients of the mixture permanently together, and of preventing their objectionable segregation, so that the material will remain indefinitely in pasty condition, with the ingredients uniformly distributed.

I have found by a series of experiments dealing with a great variety of binding materials, that glue as a binder possesses the qualifications and properties mentioned, and that in a mixture with solder powder, a liquid flux, and a suitable vehicle to give the proper consistence to the mass, a binding material of glue will prevent the segregation of the ingredients, and will preserve the pasty consistency of the mixture indefinitely.

In my improved soldering compound, the solder metal is in finely divided or powdered condition, the flux is preferably in the form of ammonium chlorid, the binding material is in the form of glue, preferably mixed with a proper proportion of glycerin to produce a glue mixture, and the vehicle to give the proper consistence to the mass, is preferably in the form of glycerin, which latter substance may be present in greater or less quantities according to the consistence the mixture is to possess. Further I have found that a mixture of such ingredients will give the most satisfactory results if, at a certain stage in its preparation, it is subjected to a baking operation as hereinafter described.

In proceeding to prepare my improved compound, I first form the glue mixture by placing one part by weight of glue, in two parts by weight of water, and allow the same to stand until the glue swells and forms a jelly. This jelly is heated over a water bath, and to each one part of the jelly, is added one and one-half parts of glycerin, which ingredients are stirred together while heated to approximately 50° C. .59% of this glue mixture, 90.97% of solder powder, 5.85% of glycerin and 2.59% of ammonium chlorid are each weighed out, and the first three ingredients separately heated to a temperature of preferably 50° C. The glycerin is then placed in a mixing machine and the glue mixture added and stirred in, after which the solder powder is added and thoroughly stirred in, and finally the cold ammonium chlorid, which had been previously carefully pulverized, is added and stirred in. The resulting paste is then baked for three hours at 50° C., and while still warm and immediately after baking, additional glycerin is added to bring the paste up to the proper consistency. The final additional quantity of glycerin added can be varied slightly in amount, according to the consistency which the final compound is to possess.

I have found that while it is preferable to subject the mixture to a baking action, yet good results may be secured without such baking, if the proportions of certain of the ingredients are changed and the following formula followed:

| | |
|---|---|
| Solder powder | 89.12% |
| Glue mixture | 1.16% |
| Glycerin | 7.19% |
| Ammonium chlorid | 2.53% |

It will be noted that this mixture differs from the first given, mainly in the proportion of the glue mixture, there being nearly double of the glue mixture in the formula last mentioned.

Soldering compounds containing the ingredients mentioned in the proportions given are suitable for putting up in cans, and have been found to retain their pasty consistence without segregation after being left to stand for long periods of time, the baked mixture however possessing a greater degree of permanency than the unbaked mixture, but both possessing this property to a degree sufficient to answer satisfactorily all the requirements of practical use.

When soldering pastes are put up in collapsible tubes, difficulty has been experienced in causing the material to properly flow by pressure, through the restricted discharge opening and I have found that this difficulty may be overcome by incorporating in the mixture, a suitable substance having the property of a lubricant, and having the effect of facilitating the flow of the mass when subjected to pressure. I have discovered vaseline to be a suitable substance for this purpose, and in incorporating the same in the soldering compound I prefer to employ the ingredients in substantially the following proportions:

| | |
|---|---|
| Solder powder | 85.646% |
| Glue mixture | 1.160% |
| Glycerin | 5.234% |
| Ammonium chlorid | 2.530% |
| Vaseline | 5.430% |

In compounding this mixture, the glue mixture is prepared as before described, the solder powder, the glue mixture, the glycerin and the vaseline are each separately heated to preferably 50°C. The glycerin is then introduced into the mixing machine and the warm glue mixture is added and stirred in. The melted vaseline is then stirred into this mixture, and finally the solder powder is added and stirred in. The resultant mass is then baked for three hours at 50°C., and immediately after baking, and while still warm, the cold ammonium chlorid which had previously been carefully pulverized, is added and thoroughly stirred in. The consistency of the final paste is entirely suitable for use in collapsible tubes.

The proportion of ingredients given in the foregoing formulas, and the method of preparing the mixture, are such that I have found in practice to answer the best results. The invention, however, is not limited to such proportions, nor to the exact methods of preparation set forth, and such changes therein as will suggest themselves to those skilled in the art, may be made without departing from the limits of my invention, the important feature of which resides in the use of a binding material which in connection with the other ingredients will possess the property of holding the same together, and which will preserve the mixture permanently in pasty form, without segregation and with the ingredients evenly distributed throughout the mass.

Having thus described my invention, what I claim is:

1. A soldering compound in the form of a homogeneous, pasty mass, consisting of a mixture of solder material in finely powdered form, a suitable flux, and a binder of glue in proper amount to prevent segregation of the ingredients of the mass.

2. A soldering compound comprising a mixture of solder powder, a suitable flux, and a binding material in the form of a mixture of glue and glycerin, said ingredients being in proper proportions to give the mass a pasty consistence.

3. A soldering compound comprising a mixture of soldering powder; a suitable flux; a vehicle to give consistence; and a binding material of glue in proper amount to prevent segregation, said mixture being in the form of a homogeneous pasty mass.

4. A soldering compound in the form of a homogeneous pasty mass consisting of a mixture of solder powder; a suitable flux; a vehicle to give consistence; a binding material of glue to prevent segregation, and a lubricant to facilitate the flow of the mass.

5. A soldering compound consisting of a pasty mixture containing at least 85.646% of solder powder; 2.53% of ammonium chlorid; .59% of glue mixture, and 5.43% of glycerin.

6. A soldering compound consisting of a pasty mixture containing 90.97% of solder powder; .59% of glue mixture; 5.85% of glycerin, and 2.59% of ammonium chlorid.

7. A soldering compound in the form of a homogeneous pasty mass consisting of a mixture of solder powder; a suitable flux; a vehicle to give consistence; a binding material to prevent segregation; and vaseline to facilitate the flow of the mass.

8. A soldering compound in the form of a homogeneous mass consisting of a mixture of solder powder; ammonium chlorid; glycerin; glue; and vaseline.

In testimony whereof, I have affixed my signature.

CHARLES E. BONINE.